J. J. CONLON.
ROTARY WIRE STRAIGHTENER.
APPLICATION FILED MAR. 24, 1913.
1,075,282.
Patented Oct. 7, 1913.
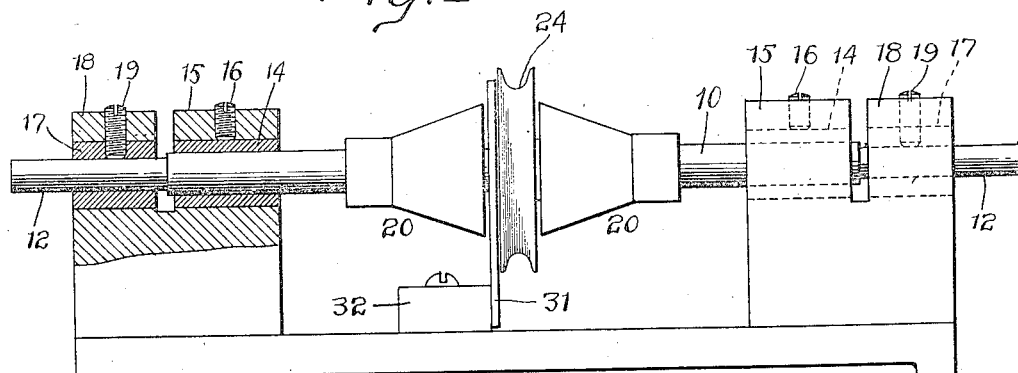
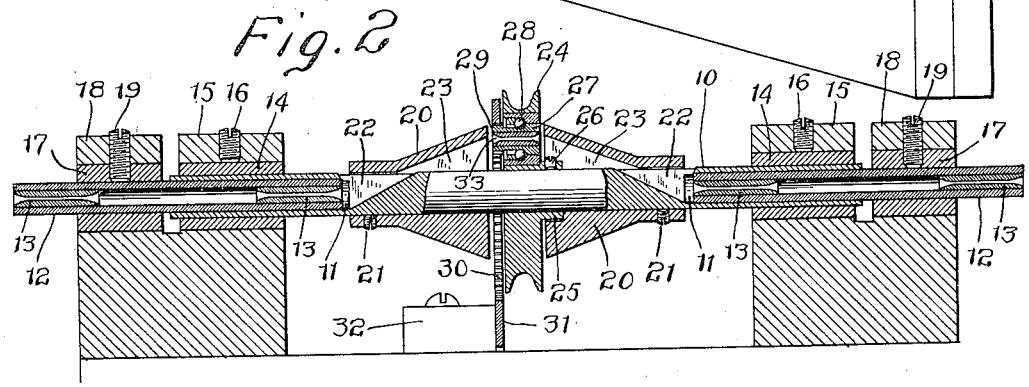
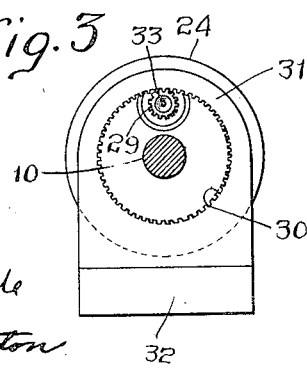
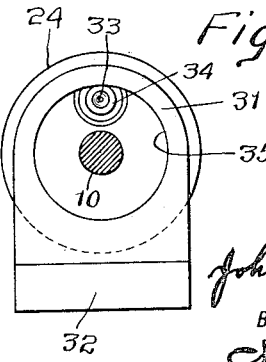

UNITED STATES PATENT OFFICE.

JOHN J. CONLON, OF DERBY, CONNECTICUT.

ROTARY WIRE-STRAIGHTENER.

1,075,282. Specification of Letters Patent. Patented Oct. 7, 1913.

Application filed March 24, 1913. Serial No. 756,381.

*To all whom it may concern:*

Be it known that I, JOHN J. CONLON, a citizen of the United States, residing at Derby, county of New Haven, State of Connecticut, have invented an Improvement in Rotary Wire-Straighteners, of which the following is a specification.

This invention has for its object to provide a rotary wire straightener in which the straightening action shall be effected by passing the wire through a driven bushing carried eccentrically by a driving wheel.

With this and other objects in view the invention consists in certain constructions and in certain parts, improvements and combinations which will be hereinafter described and then specifically pointed out in the claims hereunto appended.

In the accompanying drawing forming a part of this specification, Figure 1 is an elevation of my novel straightener partly in section; Fig. 2 a central longitudinal section partly in elevation corresponding therewith; Fig. 3 a view showing the shaft in section and one form of driving means for the bushing in elevation, and Fig. 4 is a similar view showing a modified form of driving means for the bushing.

10 denotes the shaft which is provided at its ends with longitudinal holes 11. These holes receive non-rotary tubes 12, each of which has secured at its ends bushings 13 which I term the fixed bushings. The ends of the shaft are journaled in sleeves 14 which are secured in bearing blocks 15, as by set screws 16. The tubes are rigidly secured in sleeves 17 which are secured in blocks 18 as by set screws 19. The wire may be passed through from either direction. We will suppose that it passes from left to right. After passing through the fixed bushings in the left tube the wire will pass through a slot 22 in the shaft which intersects with the hole 11 and is in alinement with the fixed bushings and the bottom of which is an incline leading outward to the periphery of the shaft.

20 denotes a guide secured to the shaft as by a set screw 21 which is provided with a slot 23 which intersects with slot 22 in the shaft and is likewise provided with an inclined bottom. The inclines at the bottoms of slots 22 and 23 act to guide the wire with perfect certainty in threading up.

At the mid-length of the shaft is a driving wheel 24 shown as provided with a grooved periphery to receive a belt and with a hub 25 which is secured to the shaft as by a set screw 26.

27 denotes a sleeve which is socketed eccentrically in the driving wheel and is provided with a ball bearing indicated by 28. Within this sleeve and secured by a drive fit is a bushing 33 through which the wire passes, being guided thereto in threading up by the slots in the shaft and guide. This sleeve in Figs. 2 and 3 is shown as provided at one end with a pinion 29 which engages an internal gear 30 formed in a plate 31 shown as secured to a block 32.

The form illustrated in Fig. 4 differs only in that a plain faced wheel 34 is substituted for the pinion and an internal circular track 35 is substituted for the internal gear, the sleeve and bushing in the first form being rotated by the engagement of the pinion with the gear and in the second form by the frictional contact of wheel 34 with the circular track. The shaft is provided on the right side of the wheel with a slot 22 and with a guide 20 having a slot 23, the same as on the other side. By placing bushings 13 in a fixed tube lying in the ends of the shaft and causing the shaft to rotate about the tube and by rotating bushings 33, I prevent the possibility of grooves being worn in the bushings, as the wire in addition to its longitudinal movement through the bushings is carried bodily around the mouth of the inner fixed bushing which insures an even wearing of the mouth of the bushing and prevents the possibility of a groove being worn in the bushing and furthermore prevents burning or marking of the wire. By providing slots 22 in the shaft in alinement with the fixed bushings and provided with inclined bottoms and providing the guides with slots 23 also having inclined bottoms leading to the rotary bushing I avoid the necessity of stopping the machine in adjusting the bushing tubes and in threading up and make it perfectly easy to pass a wire into the machine from either direction, through the rotary bushing and out again without stopping the machine.

Having thus described my invention I claim:

1. A straightener of the character described, comprising a driving wheel, a bushing eccentrically mounted therein through which the wire is passed and means for imparting axial rotation to the bushing.

2. A straightener of the character described, comprising a driving wheel, a sleeve eccentrically mounted in said wheel and carrying a pinion, a bushing in said sleeve through which the wire is passed and a fixed internal gear engaged by said pinion.

3. A straightener of the character described, comprising a shaft having holes in its ends, non-rotating tubes in said holes, bushings in said tubes, a driving wheel carried by the shaft, a rotary bushing mounted eccentrically in said wheel and means for imparting rotation to the bushing.

4. A straightener of the character described, comprising a shaft having holes in its ends, non-rotating tubes about which the shaft is mounted to rotate, bushings in said tubes, a driving wheel carried by the shaft, a rotary bushing mounted eccentrically in said wheel, means for imparting rotation to the bushing, and a rotating slotted guide by which the wire is conducted to the rotary bushing.

5. A straightener of the character described, comprising a shaft having holes in its ends and slots with inclined bottoms intersecting said holes, non-rotating tubes about which the shaft is mounted to rotate, fixed bushings in said tubes, a driving wheel carried by the shaft, a rotary bushing mounted eccentrically in said wheel, means for imparting rotation to the bushing and a guide secured to the shaft and having a slot intersecting the slot in the shaft by which the wire is conducted to the rotary bushing in threading up.

6. A straightener of the character described, comprising a shaft having holes in its ends and slots with inclined bottoms intersecting said holes, non-rotating tubes about which the shaft is mounted to rotate, fixed bushings in said tubes, a driving wheel carried by the shaft, a rotary bushing mounted eccentrically in said wheel, means for imparting rotation to the bushing and guides secured to the shaft on opposite sides of the driving wheel and having slots intersecting the slots in the shaft by which the wire may be conducted to the rotary bushing from either direction.

7. A straightener of the character described, comprising a shaft having holes in its ends and slots with inclined bottoms intersecting said holes, non-rotating tubes about which the shaft is mounted to rotate, fixed bushings in said tubes, a driving wheel carried by the shaft, a rotary bushing mounted eccentrically in said wheel and provided at one end with a pinion, and an internal gear engaged by said pinion.

8. A straightener of the character described, comprising a shaft having holes in its ends, non-rotating tubes upon which the shaft is mounted to rotate, bushings in said tubes, a driving wheel carried by the shaft, a bushing mounted eccentrically in said wheel and means for imparting axial rotation to the last mentioned bushing.

9. A straightener of the character described, comprising a driving wheel, a rotary bushing mounted eccentrically in said wheel, means for imparting axial rotation to the bushing and means for conducting the wire to the rotary bushing while the wheel is in rotation.

10. In a straightener of the character described, the combination with a driving wheel, a bushing mounted eccentrically therein and means for imparting axial rotation to the bushing, of a fixed bushing through which the wire passes before passing to the rotary bushing.

11. In a straightener of the character described, the combination with a driving wheel, a bushing mounted eccentrically therein and means for imparting axial rotation to the bushing, of a fixed bushing through which the wire passes before passing to the rotary bushing, and a guide rotating with the wheel and lying intermediate the bushings.

12. In a straightener of the character described, the combination with a driving wheel, a bushing mounted eccentrically therein and means for driving said bushing, of fixed bushings on opposite sides of the first mentioned bushing through which the wire is passed, substantially as described, for the purpose specified.

In testimony whereof I affix my signature in presence of two witnesses.

JOHN J. CONLON.

Witnesses:
  HOWARD B. PECK,
  FLORENCE K. WATSON.